United States Patent
Lee et al.

(10) Patent No.: US 9,743,322 B2
(45) Date of Patent: Aug. 22, 2017

(54) METHOD AND APPARATUS FOR PROCESSING HANDOVER OF TERMINAL IN MOBILE COMMUNICATION SYSTEM

(71) Applicant: Samsung Electronics Co., Ltd., Suwon-si, Gyeonggi-do (KR)

(72) Inventors: Hyungho Lee, Seoul (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/227,566

(22) Filed: Mar. 27, 2014

(65) Prior Publication Data
US 2014/0295844 A1    Oct. 2, 2014

(30) Foreign Application Priority Data

Mar. 28, 2013    (KR) .................. 10-2013-0033387

(51) Int. Cl.
*H04W 36/00*     (2009.01)
*H04W 36/02*     (2009.01)
*H04L 29/08*     (2006.01)

(52) U.S. Cl.
CPC ....... *H04W 36/023* (2013.01); *H04L 67/2847* (2013.01)

(58) Field of Classification Search
None
See application file for complete search history.

(56) References Cited

U.S. PATENT DOCUMENTS

| | | |
|---|---|---|
| 2005/0141455 A1 | 6/2005 | Kim et al. |
| 2008/0273498 A1 | 11/2008 | Jalil et al. |
| 2008/0310365 A1 | 12/2008 | Ergen et al. |
| 2009/0100188 A1* | 4/2009 | Li et al. .................. 709/231 |
| 2012/0051349 A1* | 3/2012 | Teyeb et al. .................. 370/338 |
| 2012/0218970 A1* | 8/2012 | Westberg et al. ............. 370/331 |
| 2012/0300747 A1* | 11/2012 | Westberg et al. ............. 370/331 |
| 2013/0003708 A1* | 1/2013 | Ko et al. ..................... 370/338 |
| 2013/0151652 A1* | 6/2013 | Brech ......................... 709/216 |
| 2013/0332559 A1* | 12/2013 | Mas Ivars et al. ............ 709/216 |
| 2014/0051445 A1* | 2/2014 | Vikberg et al. ............... 455/436 |

FOREIGN PATENT DOCUMENTS

| | | |
|---|---|---|
| EP | 1892917 A1 | 2/2008 |
| WO | 2012/148330 A1 | 11/2012 |
| WO | 2012/167106 A1 | 12/2012 |

OTHER PUBLICATIONS

Niven-Jenkins et al., Content Distribution Network Interconnection (CDNI) Problem Statement; draft-jenkins-cdni-problem-statement-02, Network Working Group Internet-Draft, Mar. 13, 2011, pp. 1-37, Internet Engineering Task Force (IETF).

* cited by examiner

*Primary Examiner* — German J Viana Di Prisco
(74) *Attorney, Agent, or Firm* — Jefferson IP Law, LLP

(57) ABSTRACT

A method and an apparatus for processing a handover of a terminal in a mobile communication system are provided. The method includes determining, by a source evolved-NodeB (eNB), a handover of a User Equipment (UE) to a target eNB, obtaining information about content transmitted to the UE from a source cache server connected to the source eNB over a backhaul network, and transmitting the content information to a target eNB.

23 Claims, 10 Drawing Sheets

METHOD AND APPARATUS FOR PROCESSING HANDOVER OF TERMINAL IN MOBILE COMMUNICATION SYSTEM

CROSS-REFERENCE TO RELATED APPLICATION(S)

This application claims the benefit under 35 U.S.C. §119(a) of a Korean patent application filed on Mar. 28, 2013 in the Korean Intellectual Property Office and assigned Serial number 10-2013-0033387, the entire disclosure of which is hereby incorporated by reference.

TECHNICAL FIELD

The present disclosure relates to a method and an apparatus for processing a handover of a terminal in a mobile communication system. More particularly, the present disclosure relates to a method and an apparatus for processing a transmission of content to a User Equipment (UE) that has performed handover from a Source evolved-NodeB (S-eNB) to a Target evolved-NodeB (T-eNB).

BACKGROUND

Video traffic shows signs of hits concentrated on popular videos. Mobile video traffic occupies 70% of total traffic, and a user experiences network congestion due to a heavy increase in the traffic of a mobile communication network. Accordingly, there is a need for a method for effectively delivering video content in a mobile network.

FIG. 1 is a graph illustrating a statistics of video content hits collected by a content supplier according to an embodiment of the related art.

Referring to FIG. 1, popular videos of high 10% in YouTube occupy total traffic of 80% or more.

Accordingly, video traffic related to frequent requests from users needs to be cached in a mobile network. In order to cache such video traffic, there is a need for a method for addressing different issues (e.g., mobility) that are attributable to characteristics when a video cache is used in a mobile network.

Regarding the type of video traffic currently used a lot in the Internet, video is divided into time-based chunks, each of the chunks has a Uniform Resource Locator (URL), and the video is delivered from a content server to a video user, that is, a User Equipment (UE), in such a manner that as the playback time elapses, the UE requests a next chunk using the HyperText Transfer Protocol (HTTP) and the content server delivers a response including the next chunk. Such a chunk-based video delivery method is used by technologies, such as HTTP Live Streaming (HLS) by Apple Inc., Flash video by Adobe Systems Inc., Dynamic Adaptive Streaming over HTTP (DASH) by $3^{rd}$ Generation Partnership Project (3GPP)/Motion Pictures Expert Group (MPEG), Smooth Streaming by Microsoft Co., and the like. Service providers, such as YouTube and Netflix, use the chunk-based video delivery method.

The structure and operation of a current Evolved Packet Core (EPC) have been designed so that data packets are delivered to the UE through an evolved-NodeB (eNB) via a Public Data Network (PDN) Gateway (P-GW) and a Serving Gateway (S-GW). In a network over which the transmission of data packets starts from an eNB, if an eNB accessed by the UE is changed due to handover, not only a transfer path is changed, but also the start point of the transmission needs to be changed because a cache server or local cache server is included in the eNB. For example, the cache of a Source evolved-NodeB (S-eNB) performs a role of a content server, and when handover occurs, the cache of a Target evolved-NodeB (T-eNB) has to start a role of a content server.

As described above, since the handover method of an EPC has been designed to be suitable for a data path along which data packets are delivered to the UE through an eNB via a P-GW and an S-GW, the handover method normally operates in an environment in which the position of a server is not changed although the UE performs handover.

Accordingly, there is a problem in that data cannot be delivered to the UE using the handover method of an EPC in an environment in which the Content Delivery Network (CDN) server of an existing eNB is no longer accessed due to handover because a cache server, that is, a CDN server, is placed in an eNB.

Furthermore, if data to be delivered is not present in the CDN server of a T-eNB to which the UE has performed handover, service with guaranteed Quality of Experience (QoE) cannot be provided to the UE using a current handover method.

Therefore, a need exists for a method and an apparatus for processing a transmission of content to a UE that has performed handover from an S-eNB to a T-eNB.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a seamless delivery of video to a User Equipment (UE) although the UE moves and performs a handover in an environment in which Content Delivery Network (CDN) equipment is included in an evolved-NodeB (eNB) and the eNB plays a role of the server of video traffic.

In accordance with an aspect of the present disclosure, a method for processing, by a source eNB, a handover of a user equipment in a mobile communication system is provided. The method includes determining the handover of the user equipment to a target eNB, requesting information about content transmitted to the user equipment from a source cache server connected to the source eNB over a backhaul network, transmitting a handover request message, including the content information received from the source cache server, to the target eNB, and receiving a response message corresponding to the handover request message from the target eNB.

In accordance with another aspect of the present disclosure, a method for processing, by a target eNB, a handover of a user equipment in a mobile communication system is provided. The method includes receiving a handover request message, including information about content transmitted to the user equipment, from a source eNB, transmitting a content determination request message, including the content information, to a target cache server connected to the target eNB over a backhaul network, receiving a content determination result, indicating whether the target cache server has pre-fetched the content transmitted to the user equipment, from the target cache server, and transmitting a handover response message, including the content determination result, to the source eNB.

In accordance with another aspect of the present disclosure, an apparatus in which a source eNB processes a handover of a user equipment in a mobile communication system is provided. The apparatus includes a wireless transceiver unit configured to transmit and receive signals and data to and from the user equipment, an interface unit configured to transmit and receive signals and data to and from a source cache server connected to the source eNB over a backhaul network, and a control unit configured to determine the handover of the user equipment to a target eNB, to request information about content transmitted to the user equipment from the source cache server, to transmit a handover request message, including the content information received from the source cache server, to the target eNB, and to receive a response message corresponding to the handover request message from the target eNB.

In accordance with another aspect of the present disclosure, an apparatus in which a target eNB processes a handover of a user equipment in a mobile communication system is provided. The apparatus includes a wireless transceiver unit configured to transmit and receive signals and data to and from the user equipment, an interface unit configured to transmit and receive signals and data to and from a target cache server connected to the target eNB over a backhaul network, and a control unit configured to receive a handover request message, including information about content transmitted to the user equipment, from a source eNB, to transmit a content determination request message including the content information to the target cache server, to receive a content determination result, indicating whether the target cache server has pre-fetched the content transmitted to the user equipment, from the target cache server, and to transmit a handover response message including the content determination result to the source eNB.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 1:
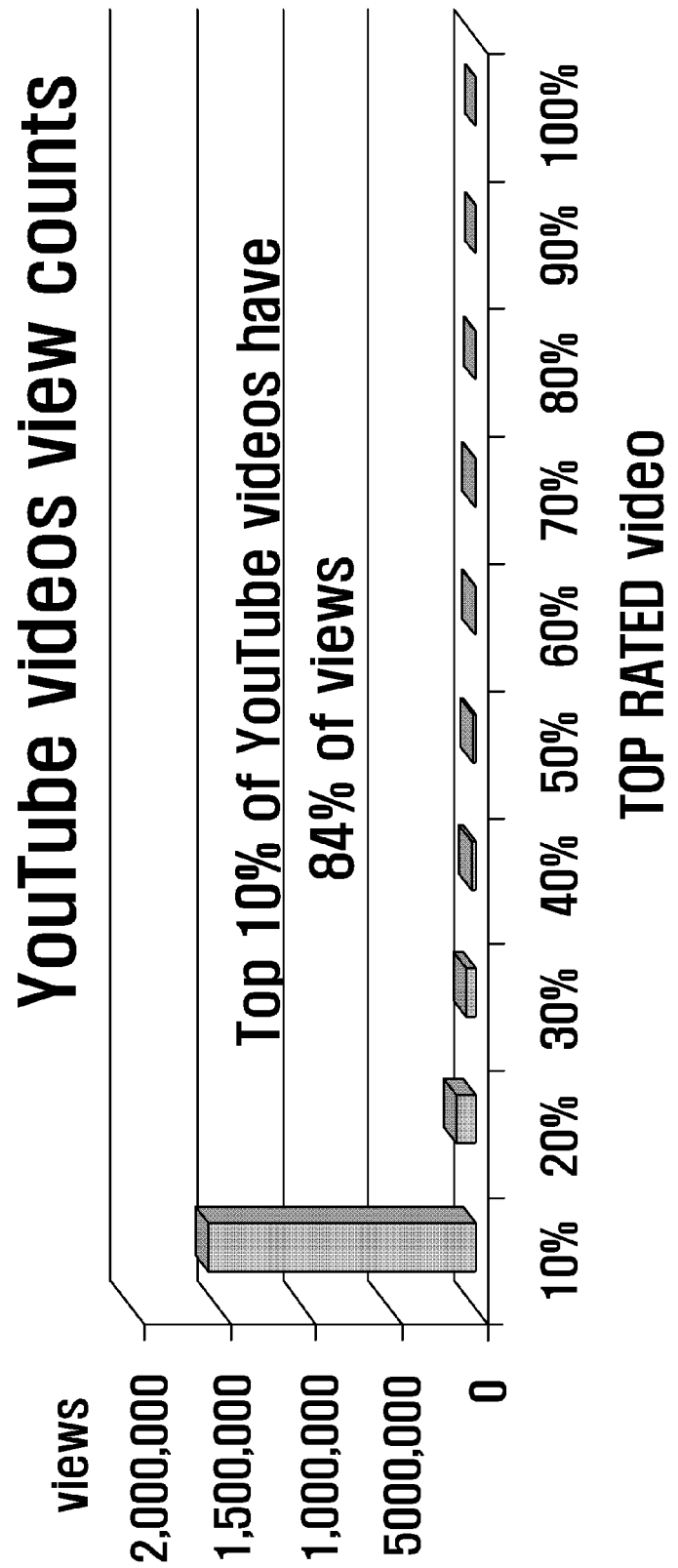
FIG. 1 is a graph illustrating a statistics of video content hits collected by a content supplier according to an embodiment of the related art.
Figure 2:
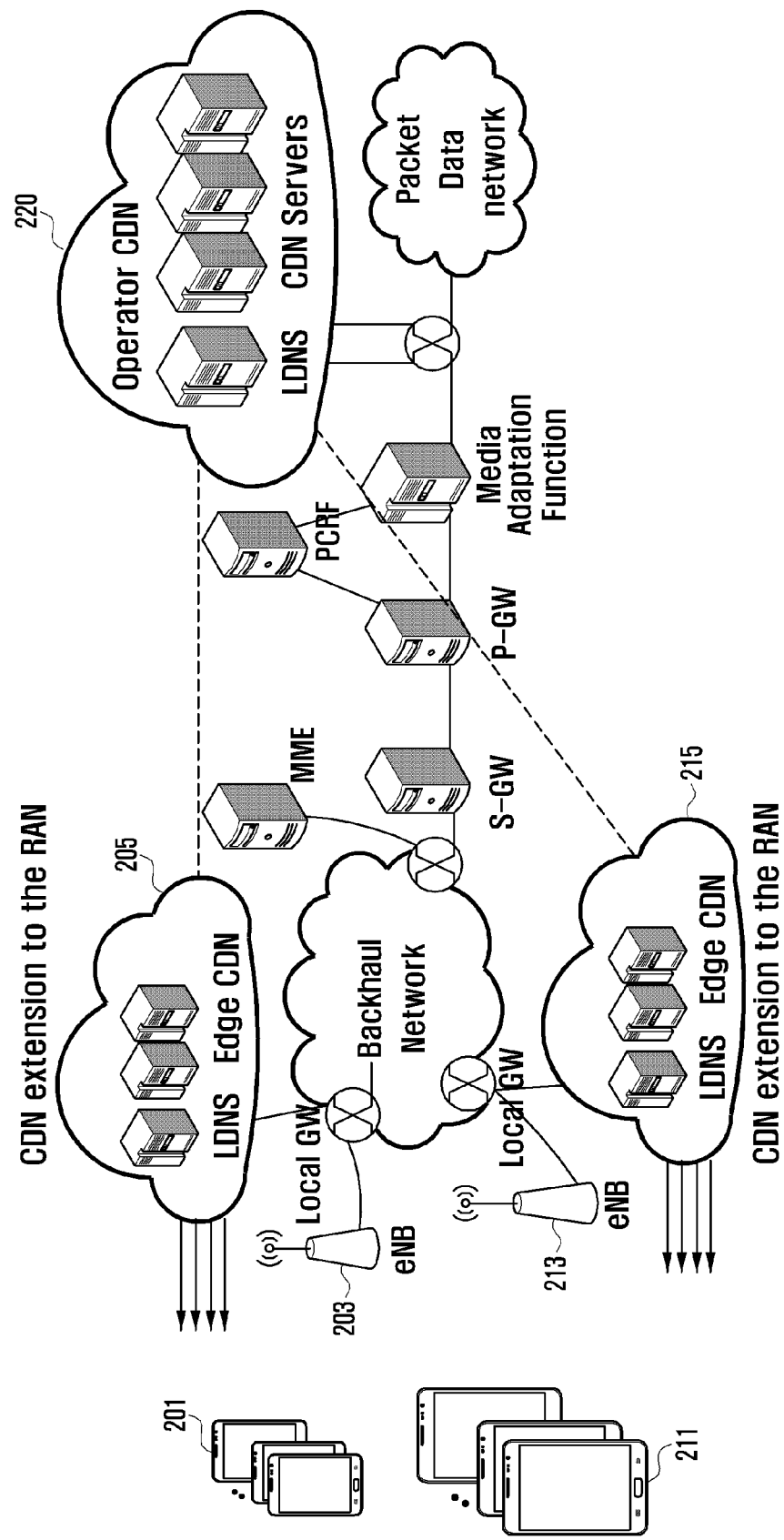
FIG. 2 is a diagram illustrating an overall configuration of a network according to an embodiment of the present disclosure.

FIG. 2 is a diagram illustrating an overall configuration of a network according to an embodiment of the present disclosure.

Referring to FIG. 2, evolved-NodeBs (eNBs) 203 and 213 request information regarding whether video content being delivered to User Equipments (UEs) 201 and 211 is present from access Content Delivery Networks (CDNs) 205 and 215 connected to the eNBs 203 and 213 over a backhaul network, request information about the HIT (fetched) or MISS (may be pre-fetched) of specific video content from the access CDNs 205 and 215, or deliver an 'End Marker Packet' message to a Target evolved-NodeB (T-eNB) after the handover of the UE.

The access CDNs 205 and 215 or access caches are connected to the eNBs 203 and 213, respectively, and perform a function for storing a video content to be transmitted to the UEs 201 and 211. In this case, FIG. 2 illustrates a case where access CDNs 205 and 215 are connected to eNBs 203 and 213, respectively, but the present disclosure is not limited thereto. For example, a plurality of eNBs may be connected to a single access CDN.

The access CDNs 205 and 215 expect a chunk of video content that will be requested by the UEs 201 and 211 configured to receive such various requests from the eNBs 203 and 213 and process the received requests, receive the chunk from a Core Cache (CC), an Original Server (OS), and an operator CDN 220, and pre-fetch the received chunk.

Furthermore, the access CDNs 205 and 215 redirect a video chunk, requested by the UEs 201 and 211 that has performed handover from a Source evolved-NodeB (S-eNB) to a T-eNB, to a target access CDN connected to the T-eNB. Thereafter, the access CDNs 205 and 215 request the S-eNB to deliver an 'End Marker Packet' message to the T-eNB.

An Interface (I/F) between the eNBs 203 and 213 and the access CDNs 205 and 215 delivers data packets and control messages between the eNBs 203 and 213 and the access CDNs 205 and 215. More particularly, the interface delivers a message for supporting the handover-related function of the eNBs 203 and 213 and the access CDNs 205 and 215.

Hereinafter, some embodiments of the present disclosure are described mainly based on a process in which an access CDN connected to a T-eNB previously prepares a next chunk of video content to be provided to the UE in order to improve Quality of Experience (QoE) of a user when the UE performs handover from an S-eNB to the T-eNB.

An embodiment of the present disclosure includes a handover preparation operation prior to handover and a handover execution operation after handover. More particularly, in the handover preparation operation, a target access CDN determines whether corresponding video content has already been fetched or may be pre-fetched based on content information included in a handover request message received from an S-eNB. A result of the determination is delivered from the target access CDN to a T-eNB.

In the handover execution operation, a chunk of video content being played back is delivered from a source access CDN to the UE via the S-eNB and the T-eNB, a next chunk request from the UE is first delivered to the source access CDN, and the source access CDN notifies the UE of the address of a CDN from which the UE will receive the video content through redirection. In this case, the address of the CDN that the source access CDN informs the UE of the address of the CDN through redirection may be the address of a target access CDN if the target access CDN has already fetched the next chunk of the video content or may fetch the next chunk of the video content and may be the address of a core CDN or an Original Server (OS) if the target access CDN is unable to pre-fetch the next chunk of the video content.

A handover preparation operation is first described below. In a handover preparation operation, an S-eNB queries a source access CDN or cache about a next chunk of video that is being watched by the UE through a content information request message or a 'Next Content IDentification (ID) Request' message, delivers a handover request message or a 'Handover Request' message including a result of the query to a target access CDN or cache, and determines the miss or hit of the video content.

Figure 3:
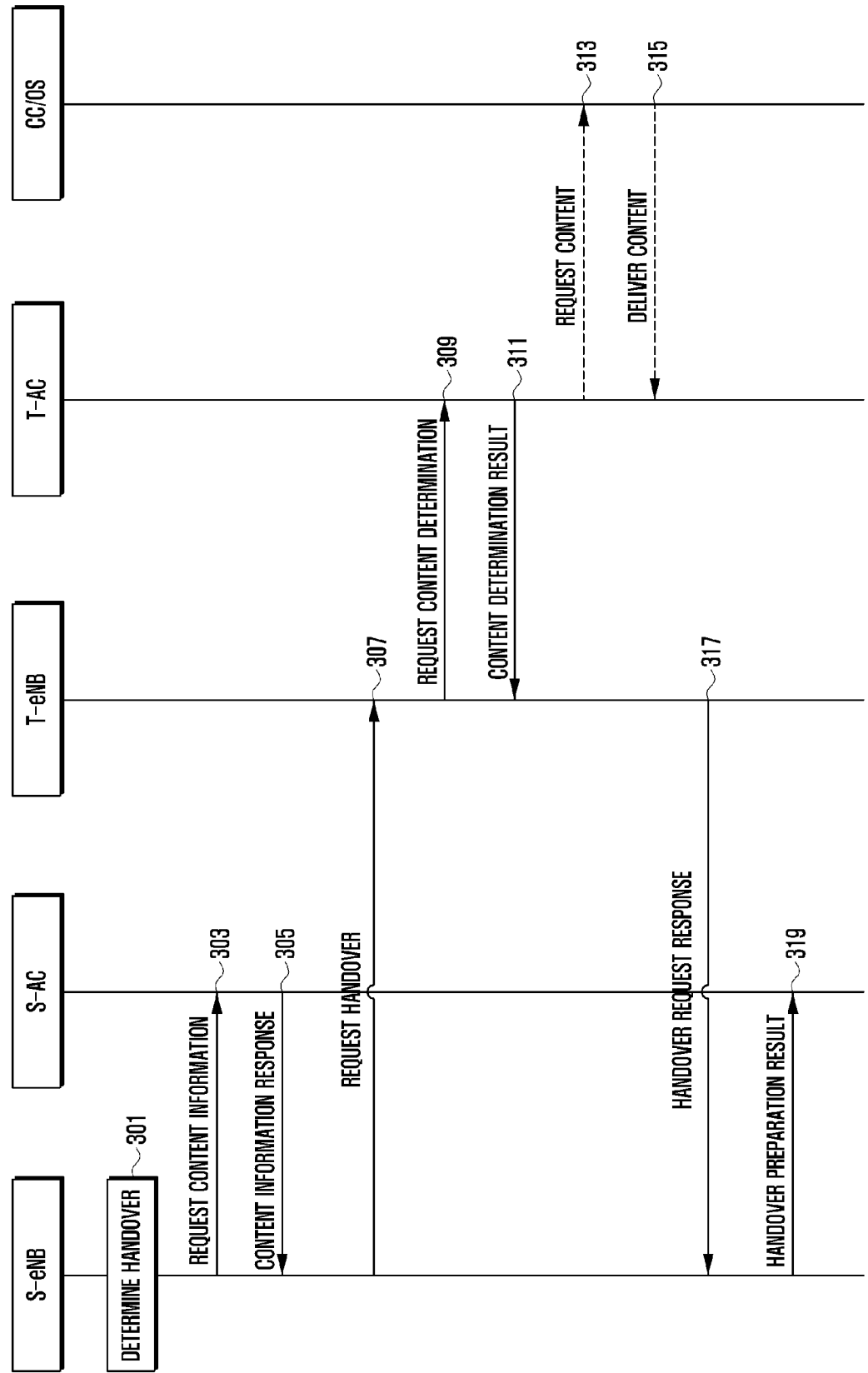
FIG. 3 is a diagram illustrating a process of executing a handover preparation operation according to an embodiment of the present disclosure.

FIG. 3 is a diagram illustrating a process of executing a handover preparation operation according to an embodiment of the present disclosure. In FIG. 3, an S-AC indicates a source access CDN or a source access cache, a T-AC indicates a target access CDN or a target access cache, a CC indicates a core cache, and an OS indicates an original server.

Referring to FIG. 3, after determining to perform the handover of the UE at operation 301, an S-eNB delivers a content information request message or a 'Next Content ID Request' message, including the ID of the UE (e.g., the Internet Protocol (IP) address of the UE), to the S-AC, queries an S-CDN about whether the UE is receiving video content, and requests information about video content to be requested next, for example, a content ID from the S-AC if the UE is receiving the video content at operation 303. In this case, the content ID is the ID of video content stored in the S-AC, and the URL of a chunk may be used as a content ID.

In response to the request, the S-AC transmits a content information response message, including the ID of a next chunk of the video content being transmitted, to the S-eNB at operation 305. The S-eNB includes the content ID, received from the S-AC, in a handover request message and transmits the handover request message or a 'Handover Request' message to a T-eNB at operation 307.

In response thereto, the T-eNB includes the content ID of the next chunk for the UE, included in the 'Handover Request' message, in a content determination request message or a 'Content HIT Determination Request' message, transmits the content determination request message to the T-AC, and queries the T-AC about a content HIT, that is, whether the T-AC has already pre-fetched the corresponding video content or whether the T-AC may pre-fetch the corresponding video content, at operation 309.

In response to the received content determination request message, the T-AC determines the contents of a content determination result message or a 'Content Hit Determination Result' message and transmits the content determination result message to the T-eNB at operation 311.

Figure 4:
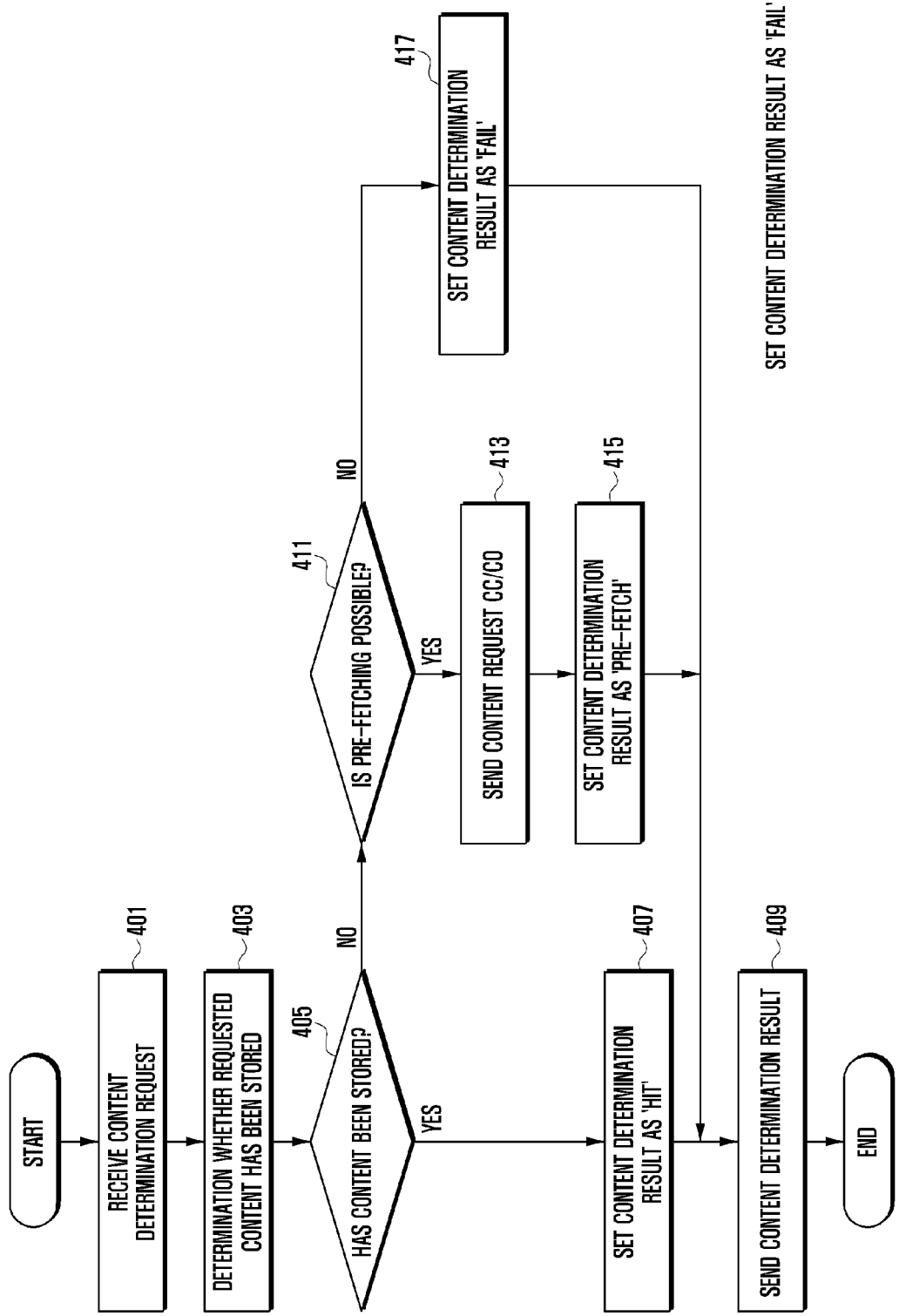
FIG. 4 is a diagram illustrating a process of determining whether content has been pre-fetched by a T-AC and notifying a Target evolved-NodeB (T-eNB) of a result of the determination according to an embodiment of the present disclosure.

FIG. 4 is a diagram illustrating a process of determining whether a video content has been pre-fetched by a T-AC and notifying a T-eNB of a result of the determination according to an embodiment of the present disclosure.

Referring to FIG. 4, at operation 401, the T-AC receives a content determination request from a T-eNB. In this case, the content determination request message includes information about a next chunk of video content that has been received from an S-AC and is being played back by a UE. The T-AC determines whether it has pre-fetched video content corresponding to the information about the next chunk at operation 403. The contents of the content determination result message are differently set depending on whether video content has been pre-fetched or may be pre-fetched. More particularly, the content determination result or the 'Content HIT Determination Result' may be obtained as a 'HIT', 'Pre-fetch', or 'FAIL' according to each content ID that is included in the content determination request message.

If it is determined that the T-AC has already pre-fetched the video content at operation 405, the T-AC sets the content determination result as 'HIT' at operation 407. If the content determination result is set as 'HIT' as described above, the T-AC prepares to deliver the pre-fetched video content to the UE when the UE performs handover and accesses the T-eNB.

If it is determined that the T-AC has not pre-fetched the video content at operation 405, the T-AC determination whether it may previously obtain the video content from a CC or an OS and pre-fetch the video content, that is, whether the video content may be pre-fetched, at operation 411.

If, as a result of the determination at operation 411, the video content is found to be pre-fetched, that is, the video content is in a 'MISS' state, the T-AC transmits a content request message to another cache, such as a CC, or an original server at operation 413, pre-fetches the video content, and prepares to transmit a response to an HTTP GET request that will be received from the UE after handover. Thereafter, the T-AC sets the content determination result as 'PRE-FETCH' at operation 415.

If, as a result of the determination at operation 411, the video content is found to be not pre-fetched, the T-AC sets the content determination result as 'FAIL' at operation 417. 'FAIL' corresponds to a case where the T-AC cannot support pre-fetching due to a reason, such as the shortage of resources. For example, the T-AC is in a state in which the T-AC may not pre-fetch a requested video chunk and immediately deliver the video chunk after the handover of the UE.

At operation 409, the T-AC includes the content determination result, set as 'HIT', 'PRE-FETCH', or 'FAIL' as described above, in a content determination result message or a 'Content Hit Determination Result' message and transmits the content determination result message to the T-eNB.

Referring back to FIG. 3, the T-AC receives the content determination request message from the T-eNB at operation 309 and transmits the content determination result message, determined as described above at operation 311, to the T-eNB. If the content determination result is determined to be 'MISS (PRE-FETCH)', the T-AC requests the video content from the CC or the OS at operation 313. In this case, the content request message may include the same content information as that included in the content determination request message received at operation 309. The T-AC receives the video content from the CC or the OS at operation 315, stores the received video content, and transmits the video content to the UE in response to a request from the UE.

At operation 317, the T-eNB includes the content determination result, received from the T-AC, in a handover request response message or a 'Hanover Request ACK' message and transmits the handover request response message to the S-eNB.

The S-eNB transmits a handover preparation result message to the S-AC at operation 319. More particularly, the handover preparation result message designates the operation of the S-AC depending on the content determination result of the T-AC when the UE requests the next chunk of the video content after handover. An operation of the S-AC will be described below.

Thereafter, in the handover preparation operation, the S-eNB stops the delivery of an end marker packet, received from an S-GW, to the T-eNB and waits until the handover procedure is completed.

A handover execution operation will be described below. In the handover execution operation, an S-AC which has received a handover preparation result message from an S-eNB delivers a chunk, being played back, to the UE that has accessed a T-eNB using a forwarding path 'S-AC→S-eNB→T-eNB'. Thereafter, the UE delivers a request for a next chunk to the S-AC, and the S-AC notifies the UE that the position of a server has changed to a T-AC. To this end, the S-AC may use HTTP 3xx redirection. Thereafter, the UE requests video content from a next chunk from the T-AC and receives the video content from the T-AC.

Figure 5:
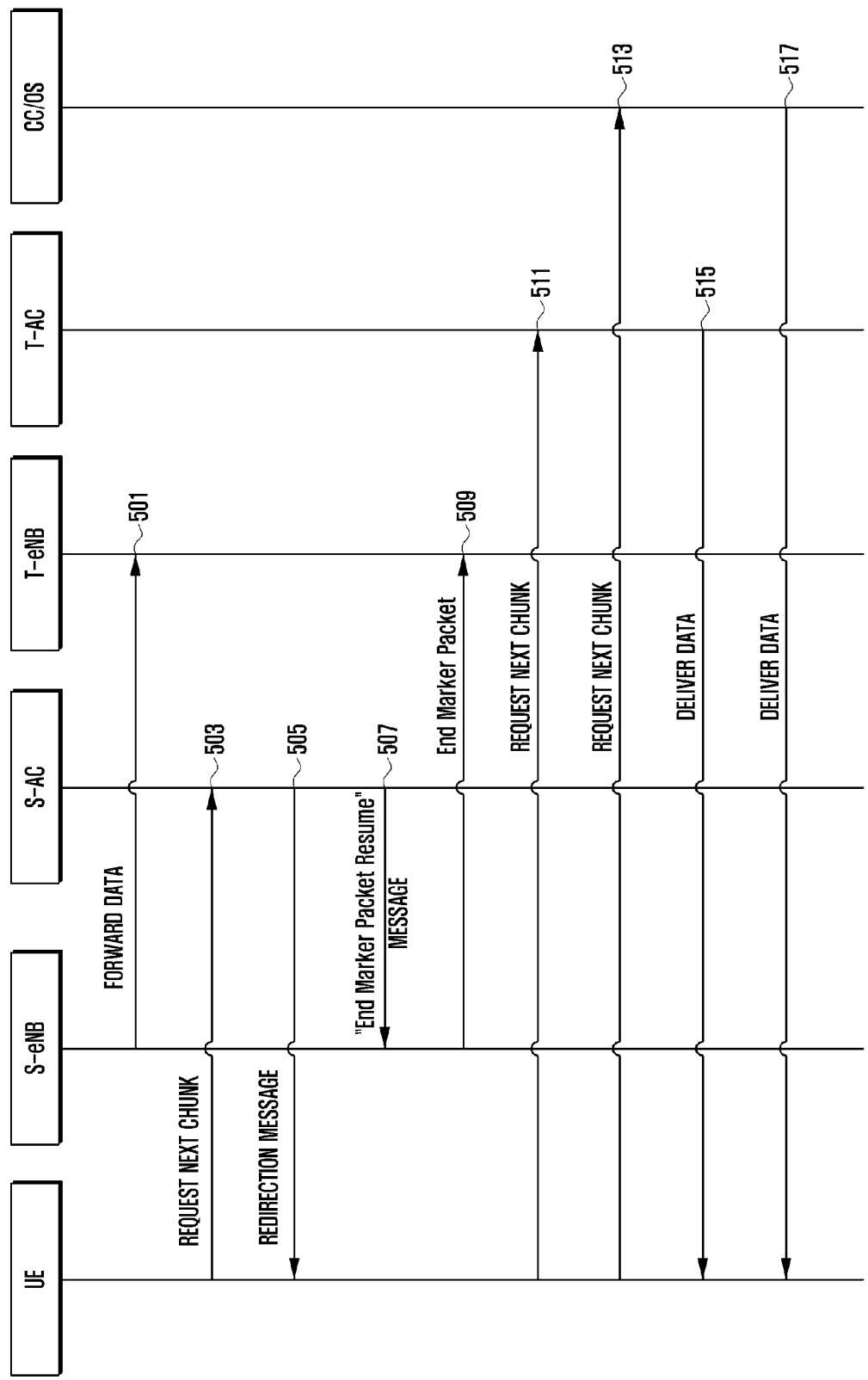
FIG. 5 is a diagram illustrating a process of executing a handover execution operation according to an embodiment of the present disclosure.

FIG. 5 is a diagram illustrating a process of executing a handover execution operation according to an embodiment of the present disclosure.

Referring to FIG. 5, at operation 501, a UE performs handover from an S-eNB to a T-eNB.

The data packets of a chunk transmitted by an S-AC are delivered to the UE along a handover forwarding path. More particularly, the data delivery path is 'S-AC→S-eNB→T-eNB→UE'.

At operation 503, the UE delivers a next chunk request message or a 'Request for Next Chunk' message for requesting the delivery of a next chunk to the S-AC. In an embodiment of the present disclosure, the next chunk request message may be delivered in the form of an HTTP GET message. Furthermore, since the destination of the next chunk request message has been set as the address of the S-AC after the UE performed handover, the message delivery path is 'UE→T-eNB→S-eNB→S-AC'. The delivery of a message from the T-eNB to the S-AC is performed along a routing path using the IP address of the S-AC.

In response to the 'Request For Next Chunk' message received from the UE, the S-AC determines the position of the requested chunk and a redirection position suitable for each case based on a 'Content Hit Determination Result' included in a handover preparation result message received from the S-eNB at operation 319 of FIG. 3, includes information about the determined positions in a content redirection message or a 'Content Redirection' message, and informs the UE of the information at operation 505. In an embodiment of the present disclosure, the redirection message may be delivered in the form of an HTTP 3xx message. More particularly, an HTTP 305 response message is used to specify that a request needs to be extracted through a proxy placed in a location header.

More particularly, a redirection address may be determined as follows based on a content determination result of the T-AC.

The content determination result is 'HIT' or 'Pre-fetch', that is, redirection to the T-CDN, and The content determination result is 'FAIL', that is, redirection to a core AC or an origin server.

Thereafter, the S-AC deletes TCP context for connection to the UE and transmits an End Marker Packet Resume' message, indicating that an end marker packet is permitted to be transmitted, to the S-eNB at operation 507. In response thereto, the S-eNB transmits the end marker packet to the T-eNB at operation 509. Thereafter, the T-eNB that has received the end marker packet releases resources allocated for data forwarding.

In response to the redirection message received from the S-AC, the UE transmits a next chunk request message to a T-AC based on an address included in the redirection message at operation 511 or transmits a next chunk request message or a 'Request for Next Chunk' message to a CC or an OS at operation 513. In an embodiment of the present disclosure, the next chunk request message may be transmitted in the form of an HTTP GET request.

When the T-AC receives the next chunk request message at operation 511, the T-AC delivers the requested video chunk to the UE at operation 515. Alternatively, when the CC or the OS receives the next chunk request message at operation 513, the CC or the OS delivers the requested video chunk to the UE at operation 517.

Figure 6:
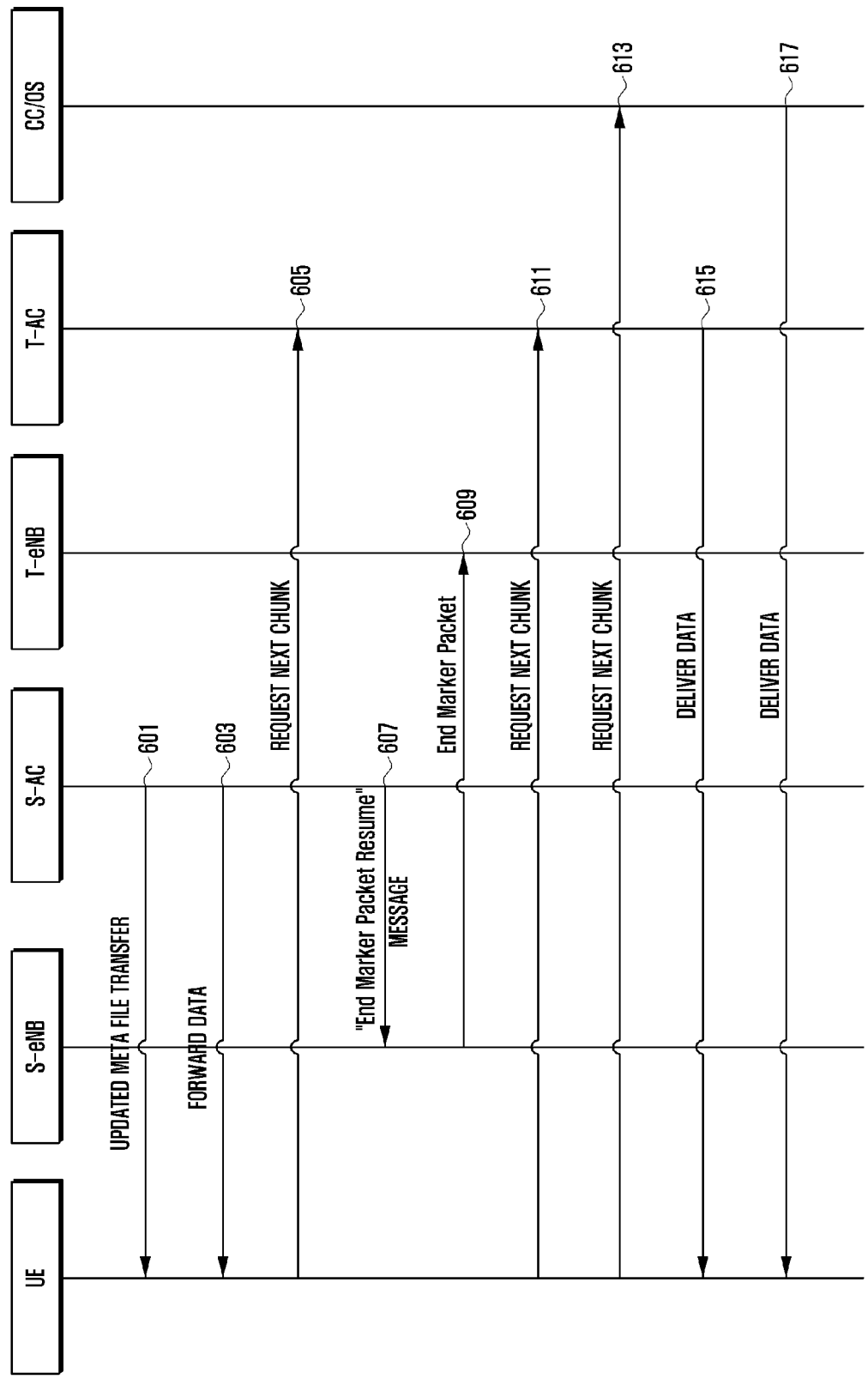
FIG. 6 is a diagram illustrating a process of executing a handover execution operation according to an embodiment of the present disclosure.

FIG. 6 is a diagram illustrating a process of executing a handover execution operation according to an embodiment of the present disclosure.

FIG. 6 illustrates a process after a UE has performed handover from an S-eNB to a T-eNB same as FIG. 5.

Referring to FIG. 6, at operation 601, a meta file which a next chunk URL of the data packets is changed to T-AC are delivered to the UE along a handover forwarding path. More particularly, the meta file delivery path is 'S-AC→S-eNB→T-eNB→UE'.

At operation 603, the data packets of a chunk transmitted by an S-AC are delivered to the UE along a handover forwarding path same as at operation 501 in FIG. 5. More particularly, the data delivery path is 'S-AC→S-eNB→T-eNB→UE'.

At operation 605, the UE delivers a next chunk request message or a 'Request for Next Chunk' message for requesting the delivery of a next chunk to the S-AC. In an embodiment of the present disclosure, the destination of the message is determined to T-AC since the URL of next chunk is changed to T-AC.

Operations 607-617 are performed as same to operations 507-517 in FIG. 5.

Figure 7:
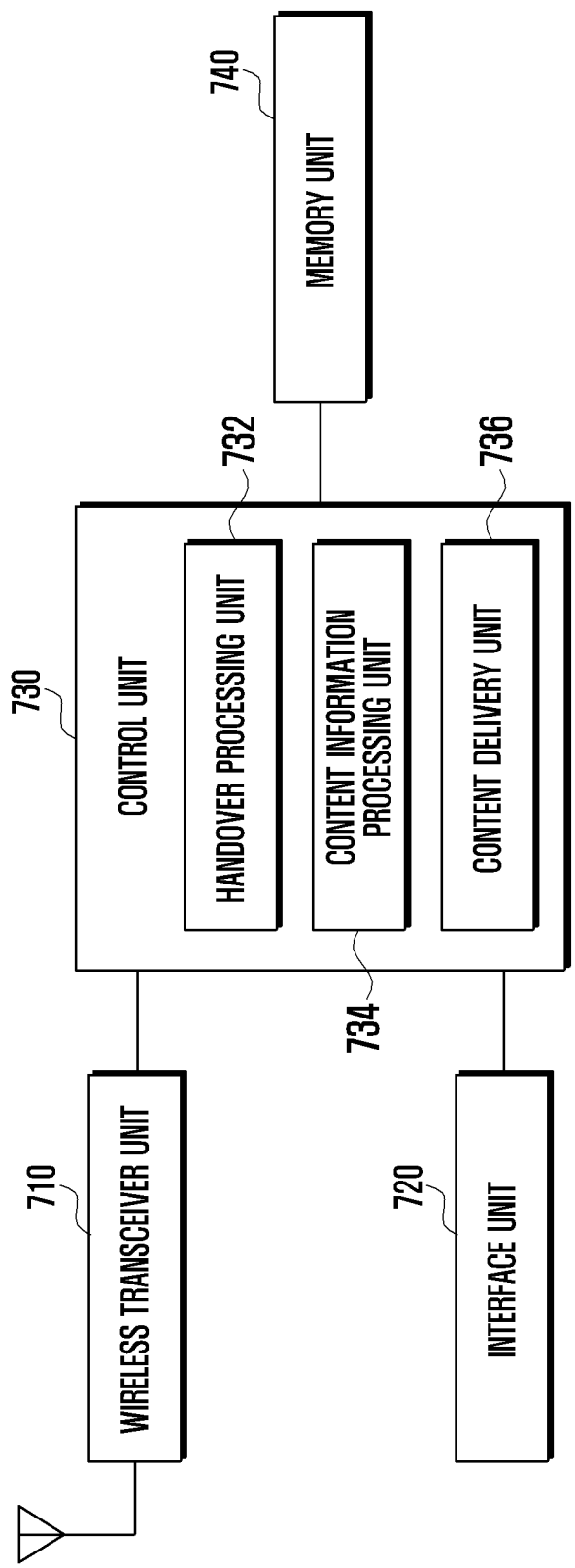
FIG. 7 is a block diagram illustrating a construction of a Source evolved-NodeB (S-eNB) according to an embodiment of the present disclosure.

FIG. 7 is a block diagram illustrating a construction of an S-eNB according to an embodiment of the present disclosure.

Referring to FIG. 7, the S-eNB may include a wireless transceiver unit 710, an interface unit 720, a control unit 730, and a memory unit 740. Furthermore, the control unit 730 may include a handover processing unit 732, a content information processing unit 734, and a content delivery unit 736 in order to perform the aforementioned handover preparation operation and handover execution operation. The elements of FIG. 7 have been implemented to describe the elements of the S-eNB, and the functions of the S-eNB may be performed by different elements that are separately included.

The wireless transceiver unit 710 is connected to the UE over a wireless network and is configured to determine the handover of the UE and to deliver the content request of the UE to the control unit 730. The interface unit 720 is connected to a core network, in particular, to an S-AC and is configured to obtain content information and perform a handover preparation result report, and the like. The memory unit 740 stores various types of programs, information, and data used for the operation of the S-eNB.

The control unit 730 controls the aforementioned handover process. More particularly, the content information processing unit 734 determines to perform the handover of the UE from the S-eNB to a T-eNB, transmits a content information request message to a corresponding S-AC, and queries the S-AC about information about a next chunk of video content being received by the UE. Furthermore, the handover processing unit 732 includes the content information, obtained from the S-AC, in a handover request message and transmits the handover request message to the T-eNB. Thereafter, when the S-eNB receives a handover request response message from the T-eNB, the handover processing unit 732 notifies the S-AC of a handover preparation result. The content delivery unit 736 forwards data, being transmitted to the UE, to the T-eNB so that the UE that has performed handover to the T-eNB may receive the data and transmits an end marker packet to the T-eNB when the handover process is completed.

Figure 8:
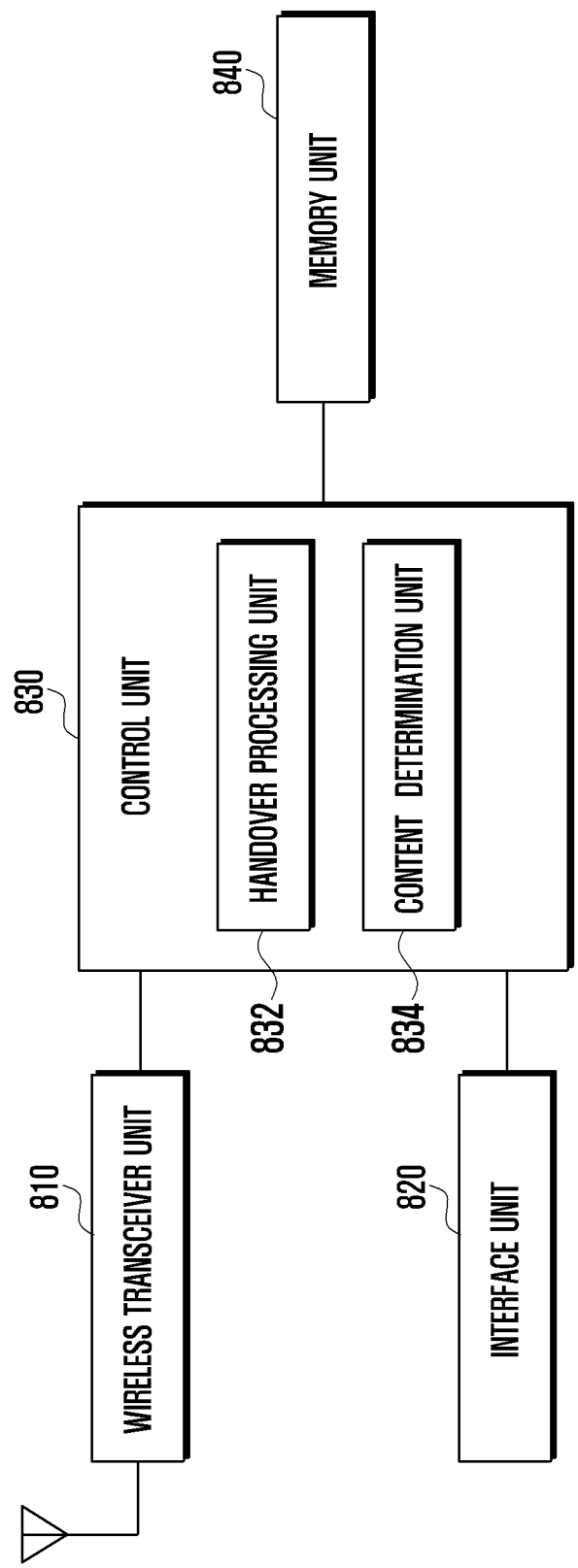
FIG. 8 is a block diagram illustrating a construction of a T-eNB according to an embodiment of the present disclosure.

FIG. 8 is a block diagram illustrating a construction of a T-eNB according to an embodiment of the present disclosure.

Referring to FIG. 8, the T-eNB may include a wireless transceiver unit 810, an interface unit 820, a control unit 830, and a memory unit 840. Furthermore, the control unit 830 may include a handover processing unit 832 and a content determination unit 834 in order to perform the aforementioned handover preparation operation and handover execution operation. The elements of FIG. 8 have been implemented to describe the elements of the T-eNB, and the functions of the T-eNB may be performed by different elements that are separately included.

The wireless transceiver unit 810 is connected to the UE over a wireless network and is configured to deliver a handover request message, received from an S-eNB, to the control unit 830. The interface unit 820 is connected to a core network. More particularly, the interface unit 820 is connected to a T-AC and is configured to determine whether video content has been pre-fetched in order to prepare handover. The memory unit 840 stores various types of programs, information, and data used for the operation of the T-eNB.

The control unit 830 controls the aforementioned handover process. More particularly, the handover processing unit 832 receives a handover request message from an S-eNB and transmits a corresponding handover request response message. Furthermore, after the handover of UE, the handover processing unit 832 receives data and an end marker packet forwarded by the S-eNB. The content determination unit 834 transmits a content determination request message to a T-AC and determines whether the T-AC has pre-fetched a next chunk of the video content being played back by the UE or may pre-fetch or the next chunk.

Figure 9:
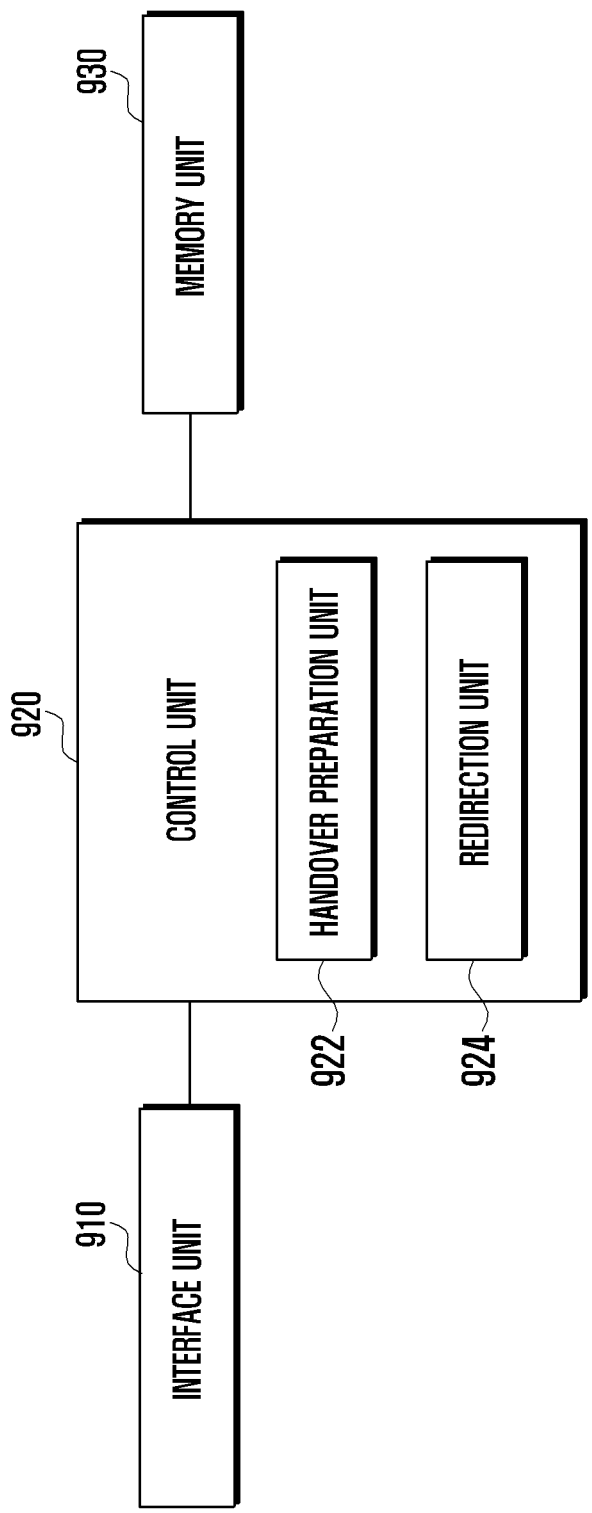
FIG. 9 is a block diagram illustrating a construction of a Source-Access Cache (S-AC) according to an embodiment of the present disclosure.

FIG. 9 is a block diagram illustrating a construction of an S-AC according to an embodiment of the present disclosure.

Referring to FIG. 9, the S-AC in accordance with an embodiment of the present disclosure may include an interface unit 910, a control unit 920, and a memory unit 930. Furthermore, the control unit 920 may include a handover preparation unit 922 and a redirection unit 924 in order to perform the aforementioned handover preparation operation and handover execution operation. The elements of FIG. 9 have been implemented to describe the elements of the S-AC, and the functions of the S-AC may be performed by different elements that are separately included.

The interface unit 910 is connected to an S-eNB and is configured to receive a content information request message and a handover preparation result message from the S-eNB. Furthermore, the memory unit 930 stores various types of programs, information, and data used for the operation of the S-AC.

The control unit 920 controls a handover preparation operation and a handover execution operation in response to a message received from an S-eNB. More particularly, when a content information request message is received from the S-eNB, the handover preparation unit 922 notifies the S-eNB of information about a next chunk of video content being played back by UE. Furthermore, when a handover preparation result is received from the S-eNB, the handover preparation unit 922 delivers the 'HIT', 'PRE-FETCH' or 'FAIL' of the T-AC to the redirection unit 924 so that reference may be subsequently made in a handover execution operation. When the next chunk of the video content is received from the UE, the redirection unit 924 includes the position of a server, for example, the address of a T-AC, a CC, or an OS from which the UE will receive data in a redirection message and transmits the redirection message to the UE. Thereafter, the redirection unit 824 transmits an 'End Marker Packet Resume' message to the S-eNB so that the handover process is completed.

Figure 10:
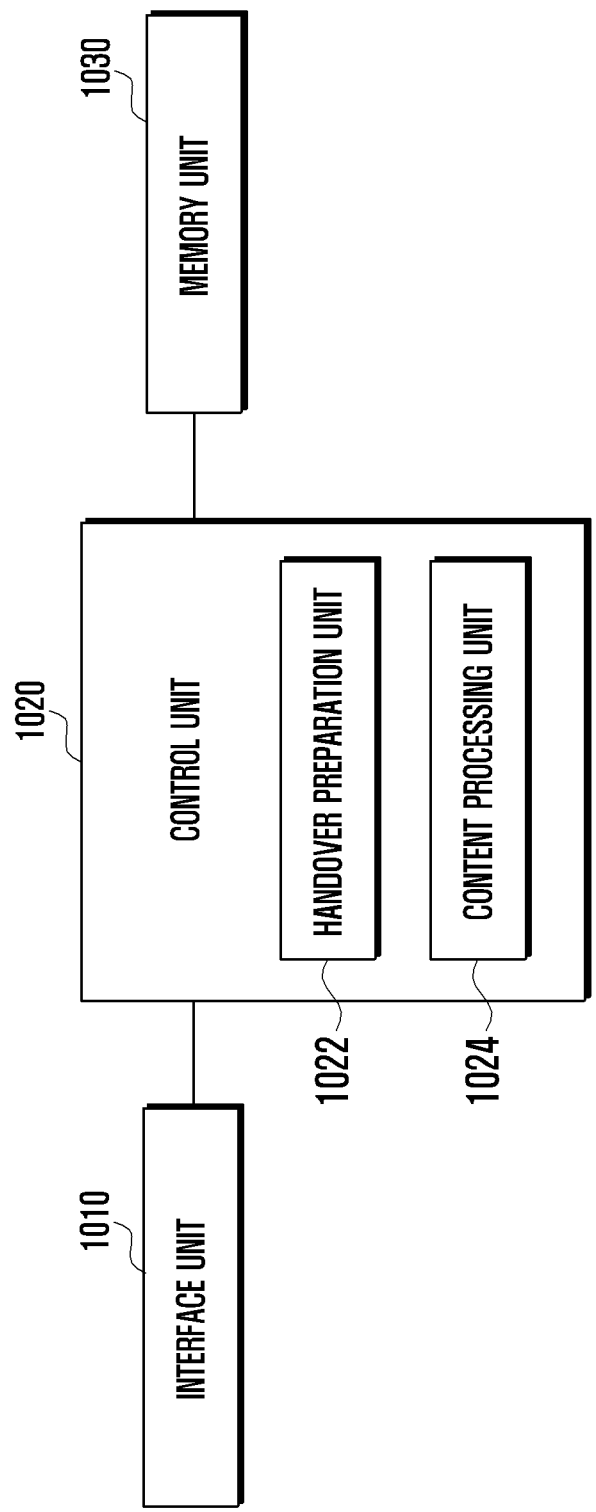
FIG. 10 is a block diagram illustrating a construction of a Target-Access Cache (T-AC) according to an embodiment of the present disclosure.

FIG. 10 is a block diagram illustrating a construction of a T-AC according to an embodiment of the present disclosure.

Referring to FIG. 10, the T-AC in accordance with an embodiment of the present disclosure may include an interface unit 1010, a control unit 1020, and a memory unit 1030.

Furthermore, the control unit 1020 may include a handover preparation unit 1022 and a content processing unit 1024 in order to perform the aforementioned handover preparation operation and handover execution operation. The elements of FIG. 10 have been implemented to describe the elements of the T-AC, and the functions of the T-AC may be performed by different elements that are separately included.

The interface unit 1010 is connected to a T-eNB and a CC/OS and is configured to receive a content determination request message from the T-eNB and also request and receive content from the CC/OS if content may be pre-fetched. Furthermore, the memory unit 1030 stores various types of programs, information, and data used for the operation of a T-AC.

The control unit 1020 controls the aforementioned handover preparation operation and handover execution operation in response to a message received from the T-eNB. More particularly, when a content determination request message is received from the T-eNB, the handover preparation unit 1022 determines whether requested content, that is, a next chunk of video content being played back by UE, has been stored. The handover preparation unit 1022 sets a content determination result depending on whether content has been pre-fetched or whether the content may be pre-fetched based on a result of the determination and transmits the content determination result to the T-eNB. Furthermore, if, as a result of the determination, it is found that the content may be pre-fetched, the handover preparation unit 1022 transmits a content request message to a CC/OS in which the content has been pre-fetched, receives the content from the CC/OS, and stores the received content.

Thereafter, when a request message for a next chunk is received from the UE after handover, the content processing unit 1024 transmits corresponding data to the UE.

In accordance with the method and apparatus for processing the handover of the UE in a mobile communication system according to the various embodiments of the present disclosure, data can be seamlessly transmitted to the UE because a cache server connected to a T-eNB previously pre-fetches content to be transmitted to the UE before the UE completes handover from an S-eNB to the T-eNB.

As described above, those skilled in the art to which the present disclosure pertains will appreciate that the present disclosure may be implemented in other forms without departing from the technical spirit or essential characteristics of the present disclosure. Accordingly, the aforementioned various embodiments should be constructed as being illustrative not as being restrictive from all aspects. The scope of the present disclosure is defined by the following claims, rather than the detailed description, and the meanings and scope of the claims and all changes or modified forms derived from their equivalents should be construed as falling within the scope of the present disclosure.

While the present disclosure has been shown and described with reference to various embodiments, it will be understood by those skilled in the art that various changes in form and details may be made therein without departing from the spirit and scope of the present disclosure as defined by the appended claims and their equivalents.

What is claimed is:

1. A method by a source base station in a mobile communication system, the method comprising:
    determining a handover of a terminal to a target base station;
    requesting information including an identification of content to be transmitted to the terminal, from a source cache server connected to the source base station over a backhaul network;
    transmitting a handover request message comprising the requested information including the identification of the content, to the target base station;
    receiving a response message corresponding to the handover request message from the target base station;
    delivering a next content request message of the terminal, received from the target base station, to the source cache server; and
    delivering a redirection message including an address of a server in which a next content is stored, received from the source cache server, to the target base station,
    wherein the redirection message is transmitted from the target base station to the terminal.

2. The method of claim 1, wherein:
    the response message comprises a content determination result indicating whether a target cache server connected to the target base station has pre-fetched the content transmitted to the terminal, and
    the method further comprising transmitting the content determination result to the source cache server.

3. The method of claim 2, wherein the content determination result comprises any one of an indicator indicating that the target cache server has pre-fetched the content, an indicator indicating that the target cache server is able to pre-fetch the content from a core cache server, and an indicator indicating that the target cache server is unable to pre-fetch the content.

4. The method of claim 1, further comprising:
    receiving a message requesting a transmission of an end marker packet, from the source cache server; and
    transmitting the end marker packet to the target base station.

5. The method of claim 1, wherein the address of the server included in the redirection message comprises at least one of an address of a target cache server connected to the target base station and an address of a core cache server.

6. A method by a target base station in a mobile communication system, the method comprising:
    receiving a handover request message, comprising information including an identification of content to be transmitted to a terminal, from a source base station;
    transmitting a content determination request message, comprising the information including the identification of the content, to a target cache server connected to the target base station over a backhaul network;
    receiving a content determination result, indicating whether the target cache server has pre-fetched the content transmitted to the terminal, from the target cache server;
    transmitting a handover response message, including the content determination result, to the source base station;
    delivering a next content request message, received from the terminal, to the source base station; and
    delivering a redirection message including an address of a server in which a next content is stored, received from the source base station, to the terminal.

7. The method of claim 6, wherein the content determination result comprises any one of an indicator indicating that the target cache server has pre-fetched the content, an indicator indicating that the target cache server is able to pre-fetch the content from a core cache server, and an indicator indicating that the target cache server is unable to pre-fetch the content.

8. The method of claim 6, further comprising:
receiving an end marker packet from the source base station.

9. The method of claim 6, wherein the address of the server included in the redirection message comprises at least one of an address of the target cache server and an address of a core cache server.

10. The method of claim 8, further comprising delivering the next content request message, received from the terminal, to the address of the server included in the redirection message.

11. A source base station in a mobile communication system, the source base station comprising:
a wireless transceiver configured to transmit and receive signals and data to and from a terminal;
an interface configured to transmit and receive signals and data to and from a source cache server connected to the source base station over a backhaul network; and
at least one processor coupled to the wireless transceiver and the interface, wherein the at least one processor is configured to control to:
determine a handover of the terminal to a target base station,
request information including an identification of content to be transmitted to the terminal from the source cache server,
transmit a handover request message, comprising the requested information including the identification of the content, to the target base station,
receive a response message corresponding to the handover request message from the target base station,
deliver a next content request message of the terminal, received from the target base station, to the source cache server, and
deliver a redirection message including an address of a server in which a next content is stored, received from the source cache server, to the target base station,
wherein the redirection message is transmitted from the target base station to the terminal.

12. The source base station of claim 11, wherein:
the response message comprises a content determination result indicating whether a target cache server connected to the target base station has pre-fetched the content transmitted to the terminal, and
the at least one processor is further configured to transmit the content determination result to the source cache server.

13. The source base station of claim 12, wherein the content determination result comprises any one of an indicator indicating that the target cache server has pre-fetched the content, an indicator indicating that the target cache server is able to pre-fetch the content from a core cache server, and an indicator indicating that the target cache server is unable to pre-fetch the content.

14. The source base station of claim 11, wherein the at least one processor is further configured to control to:
receive a message requesting a transmission of an end marker packet, from the source cache server; and
transmit the end marker packet to the target base station.

15. The source base station of claim 14, wherein the address of the server included in the redirection message comprises at least one of an address of a target cache server connected to the target base station and an address of a core cache server.

16. A target base station in a mobile communication system, the target base station comprising:
a wireless transceiver configured to transmit and receive signals and data to and from a terminal;
an interface configured to transmit and receive signals and data to and from a target cache server connected to the target base station over a backhaul network; and
at least one processor coupled to the wireless transceiver and the interface, wherein the at least one processor is configured to control to:
receive a handover request message, comprising information including an identification of content to be transmitted to the terminal, from a source base station,
transmit a content determination request message comprising the information including the identification of the content to the target cache server,
receive a content determination result, indicating whether the target cache server has pre-fetched the content transmitted to the terminal, from the target cache server,
transmit a handover response message comprising the content determination result to the source base station,
deliver a next content request message, received from the terminal, to the source base station; and
deliver a redirection message including an address of a server in which a next content is stored, received from the source base station, to the terminal.

17. The target base station of claim 16, wherein the content determination result comprises any one of an indicator indicating that the target cache server has pre-fetched the content, an indicator indicating that the target cache server is able to pre-fetch the content from a core cache server, and an indicator indicating that the target cache server is unable to pre-fetch the content.

18. The target base station of claim 16, wherein the at least one processor is further configured to control to:
receive an end marker packet from the source base station.

19. The target base station of claim 16, wherein the address of the server included in the redirection message comprises at least one of an address of the target cache server and an address of a core cache server.

20. The target base station of claim 18, the at least one processor is further configured to control to deliver the next content request message, received from the terminal, to the address of the server included in the redirection message.

21. A method by a source cache server in a mobile communication system, the method comprising:
receiving a message which requests information including an identification of content to be transmitted to a terminal, from a source base station;
transmitting the information including the identification of the content to the source base station; and
receiving a content check result, indicating whether or not a target cache server connected to a target base station of the terminal has the content transmitted to the terminal, from the source base station;
receiving a next content request message of the terminal;
identifying an address of a server in which a next content is stored; and
transmitting a redirection message including the address of the server in which next content is stored, to the terminal.

22. The method of claim 21, further comprising:
transmitting a message requesting a transmission of an end marker packet, to the source base station,
wherein the end marker packet is transmitted from the source base station to the target base station.

23. The method of claim 21, further comprising:
transferring a meta file of content, now being transmitted to the terminal, to the target base station;
forwarding the content now being transmitted to the terminal to the target base station; and
transmitting a message, requesting that an end marker packet be transmitted to the target base station, to the source base station,
wherein the meta file comprises a URL address of the content.

\* \* \* \* \*